US005678030A

United States Patent [19]

Sferrazza et al.

[11] Patent Number: 5,678,030

[45] Date of Patent: Oct. 14, 1997

[54] MODIFICATION OF TIMING IN AN EMULATOR CIRCUIT AND METHOD

[75] Inventors: Paul K. Sferrazza, Somerville; Joseph W. Harmon, East Brunswick, both of N.J.

[73] Assignee: Harris Corporation, Melbourne, Fla.

[21] Appl. No.: 395,863

[22] Filed: Feb. 28, 1995

[51] Int. Cl.[6] .............................. G06F 9/44; G06F 13/42

[52] U.S. Cl. .............................. 395/500; 395/309

[58] Field of Search .............................. 395/500, 309

[56] References Cited

U.S. PATENT DOCUMENTS

| | | | |
|---|---|---|---|
| 4,641,261 | 2/1987 | Dwyer et al. | 395/883 |
| 4,975,593 | 12/1990 | Kurakazu et al. | 327/141 |
| 5,307,469 | 4/1994 | Mann | 395/405 |
| 5,359,717 | 10/1994 | Bowles et al. | 395/309 |

OTHER PUBLICATIONS

Computer Dictionary, Microsoft Press, Second Edition, 1994. (p. 265).

*Primary Examiner*—Kevin J. Teska
*Assistant Examiner*—Nicole L. Dehlitsch-Moats
*Attorney, Agent, or Firm*—Rogers & Killeen

[57] ABSTRACT

An emulator circuit and method of emulating operation of a computer system in which the emulator circuit may be selectively operated with memory devices that require coincident availability of data and address information during a clock cycle, and with systems that require data and address information at different times during the clock cycle. (Address information including address signals for selecting memory locations and memory control signals.) The circuit includes a data bus port for receiving data that has a transition during a clock cycle, plural address lines, each for communicating address information that has a transition during the clock cycle, an address latch control (ALC) switch with a buffer for each of the address lines, each address buffer having a latch with a first position wherein the data transition and address information transition occur at the same time during a clock cycle, and a second position wherein the address information transition leads the data transition by about one-half clock cycle, and a logical gate for receiving an ALC signal that indicates whether the first position or the second position is selected.

21 Claims, 4 Drawing Sheets

MODIFICATION OF TIMING IN AN EMULATOR CIRCUIT AND METHOD

BACKGROUND OF THE INVENTION

The present invention relates to methods and circuits for emulating operation of computer systems, and more particularly to an emulator circuit for a microcontroller that can be selectively operated to provide data and address information at the same or different times, as needed for the particular operation of the emulator circuit.

When a new computer system, such as a microcontroller, is being developed, it is common to also develop a companion device for emulating operation of the computer system. An emulator may be functionally equivalent to the computer system and may be used for a variety of purposes well known in the art, including prototype development, pre-production of systems for mask program applications, and development systems. An emulator circuit may include connections for receiving data, for providing address information, and for signals to control operation of the emulator circuit. As used herein, "address information" may include both address signals for selecting memory locations, and memory control signals, such as read, write, and chip select signals for controlling memory operations.

The emulator circuit may be operated with external memory devices that require coincident availability of data and address information during a clock cycle, and with systems, such as development tools, that require address information and data at different times during the clock cycle. This may be more clearly understood with reference to FIGS. 1 and 2 that illustrate pairs of information streams, one for data and one for address information. Breaks between groups of information in the streams are indicated by X, and are denoted herein as transitions. The transitions may be any of the various breaks between information groups known in the art. A clock cycle is the time between adjacent transitions. In FIG. 1, the address information leads the data, normally by one-half clock cycle; this timing is typically required for conventional development tools used by an emulator circuit during development of the computer system, and is typical of the internal timing of an emulator circuit. In FIG. 2, the address information and data are coincident (or nearly so); this timing is typically required to interface with standard external memories.

Prior art emulators are designed for one or the other of these two timing requirements, and an emulator designed to meet one requirement will not meet the other requirement. This has led to the use of two emulator circuits, or the addition of external circuitry, adding time and cost to computer system development.

Accordingly, it is an object of the present invention to provide a novel circuit and method for emulating operation of a computer system that obviates the problems of the prior art.

It is another object of the present invention to provide a novel circuit and method for emulating operation of a computer system in which address information transitions and data transitions may be coincident when needed for emulator operation with external memories, or the address information transitions may lead data transitions when needed for operation with other systems.

It is yet another object of the present invention to provide a novel circuit and method for emulating operation of a computer system in which the time difference between address information transitions and data transitions may be selectively changed.

It is still another object of the present invention to provide a novel circuit and method for emulating operation of a computer system in which an address latch control (ALC) signal indicates whether the time difference between address information transitions and data transitions is to be zero or one-half clock cycle.

It is a further object of the present invention to provide a novel circuit and method for emulating operation of a computer system in which an ALC signal provides a signal to an address buffer with a latch therein for selecting whether the address information transitions are to lead the data transitions.

It is still a further object of the present invention to provide a novel circuit and method for emulating operation of a computer system in which an ALC signal provides either a high signal to indicate that the address information transition is to lead the data transition by one-half clock cycle, or a low signal to indicate that the transitions are to be coincident.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
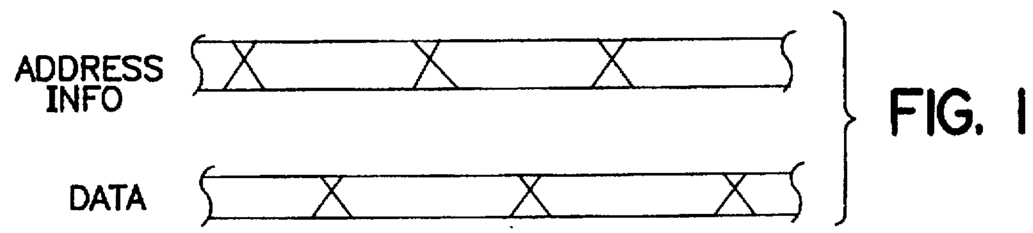
FIG. 1 is an illustration of a timing sequence in which address information transitions lead data transitions.
Figure 2:
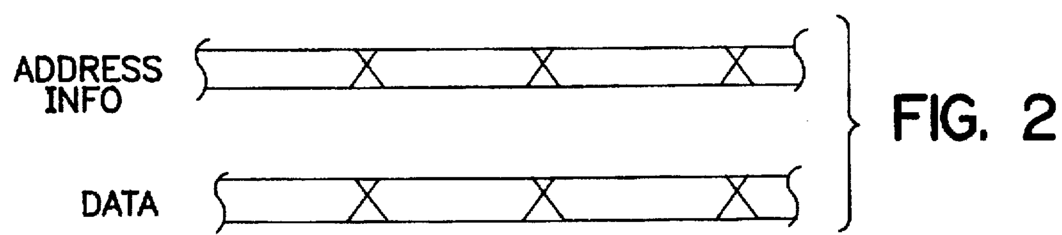
FIG. 2 is an illustration of a timing sequence in which address information transitions are coincident with data transitions.
Figure 3:
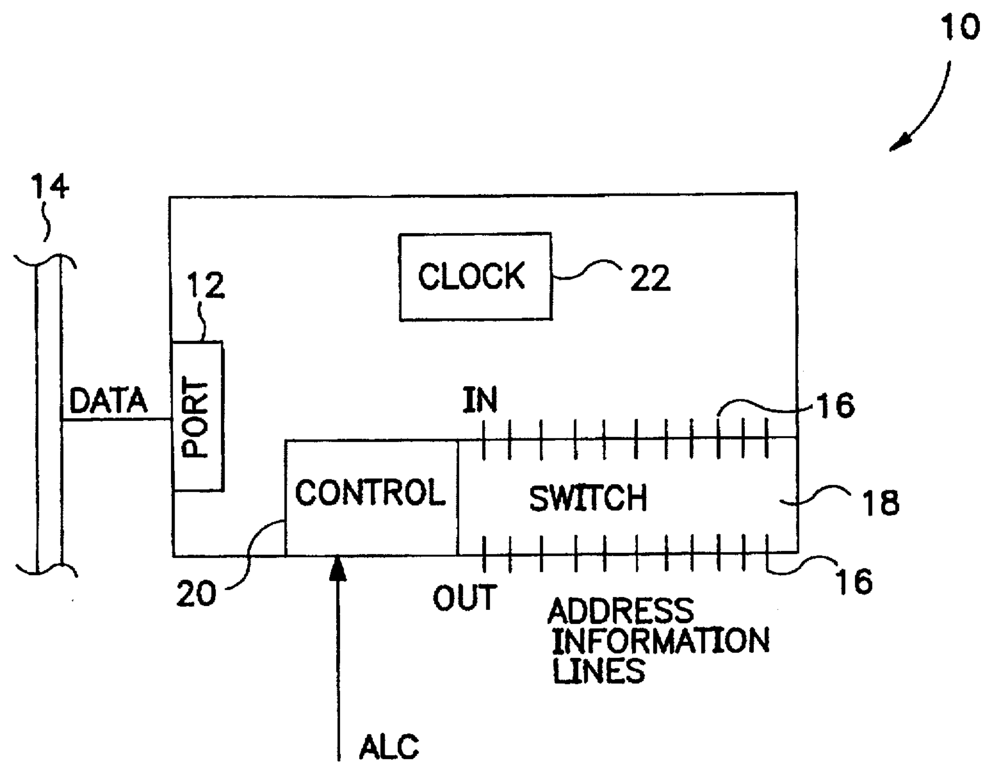
FIG. 3 is a partial block diagram of an embodiment of the present invention.

In an embodiment of the present invention, an emulator for emulating operation of a microcontroller may be selectively operated with memory devices that require coincident availability of data and address information during a clock cycle, and with other systems, such as development tools, that require address information and data at different times during the clock cycle. With reference now to FIG. 3, an emulator 10 may include a data bus port 12 for receiving data from a data bus 14 (the data having a transition during each clock cycle), plural address information lines 16, each for communicating address information that has a transition during the clock cycle, an address latch control (ALC) switch 18 for the address lines with a first position wherein the data transition and address information transition occur at the same time (or nearly so) during a clock cycle, and a second position wherein the address information transition and the data transition do not occur at the same time. The switch 18 may be operated by an ALC signal provided to a controller 20. In a preferred embodiment, the ALC signal is either high or low. A clock 22 may provide clock signals for timing the data and address information transitions.

Figure 4:
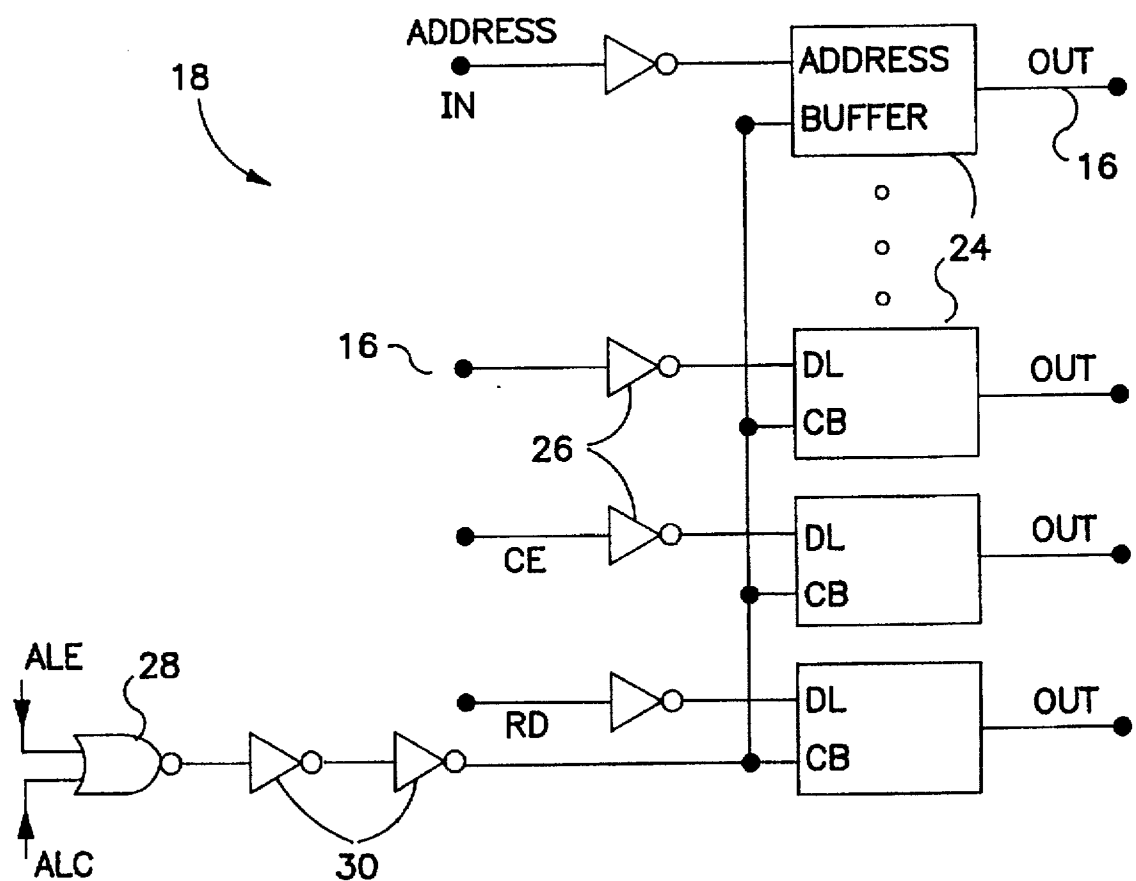
FIG. 4 is circuit diagram of an embodiment of the selection circuit of an embodiment of the present invention.

An embodiment of the switch 18 is shown in FIG. 4. An address buffer 24 for selectively changing the time difference of the address information transitions and the data transitions may be provided for each address line 16. The address information may be provided through inverters 26 to a first port (DL) of the address buffers 24, and control signals may be provided to a second port (CB). The ALC signals may be provided to a logical gate 28 (e.g., the NOR gate shown) with an address latch enable (ALE) signal provided internally. The output of the logical gate 28 may be provided through inverters 30 to the port CB of the address buffers 24.

Figure 5:
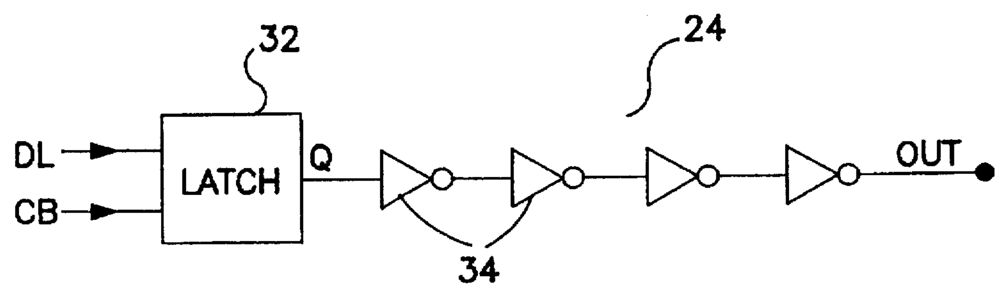
FIG. 5 is a circuit diagram of an address buffer of the embodiment of FIG. 4.
Figure 6A:
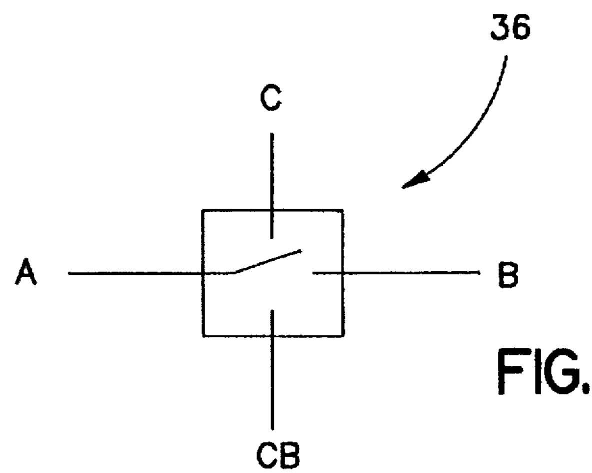
FIG. 6 is a circuit diagram of a latch of the embodiment of FIG. 5, and FIG. **6*a*** illustrates an embodiment of a switch within the latch.
Figure 6:
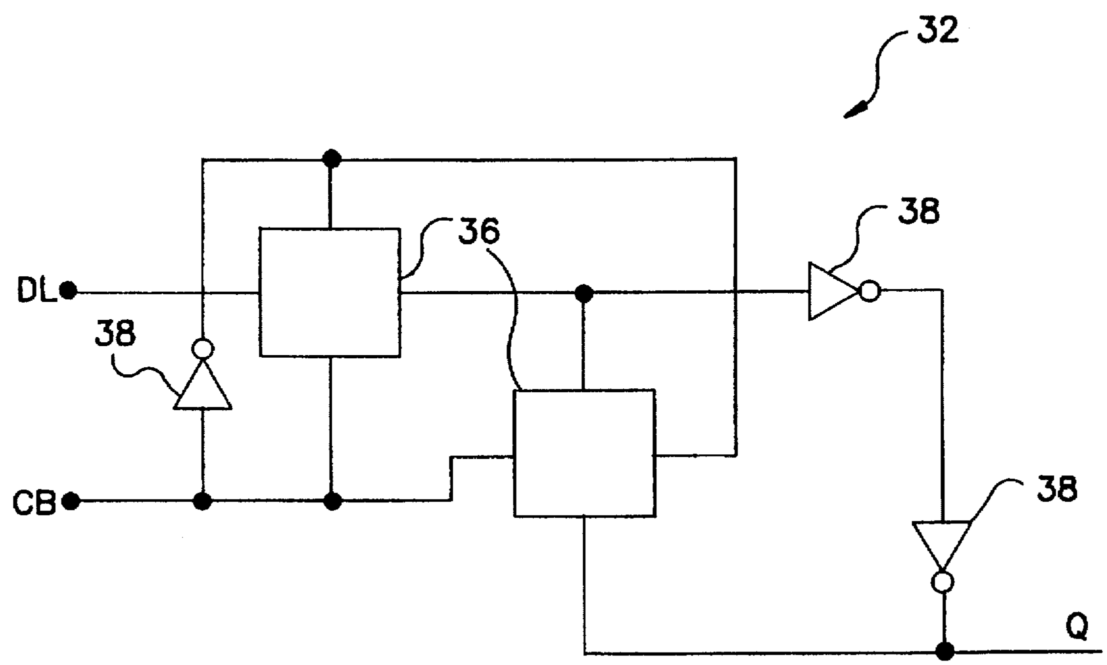

With reference now to FIGS. 5 and 6, each address buffer 24 may include a latch 32 and inverters 34. Each latch 32 may be conventional, or may comprise the circuit of FIG. 6. As shown therein, two switches 36 may be connected through inverters 38. FIG. 6a illustrates a preferred embodiment of the switch 36 in which two inputs C and CB determine whether switch AB is open or closed. The truth table for the switch 36 may be:

| C | CB | Switch AB |
|---|---|---|
| 1 | 0 | Closed |
| 0 | 1 | Open |
| 1 | 1 | Closed |
| 0 | 0 | Closed |

In operation, data having a transition each clock cycle are received at data bus port 12 and are communicated as needed in the emulator. Address information for the received data is communicated through plural address lines 16, the address information also having a transition during each clock cycle. If the data transition and the address information transition are to be aligned so that they occur at the same time during each clock cycle, a first position of the ALC switch 18 may be selected, thereby enabling the latch 32 so that the address information is latched. When the latch 32 is enabled in the first position the address information transitions are delayed by one-half cycle to bring the external address and data bus signals into alignment.

If the data transition and the address information transition are to occur at different times during each clock cycle, a second position of the ALC switch 18 may be selected, thereby disabling the latch 32 so that the address transitions lead the data transitions, for example by one-half clock cycle. When the latch 32 is disabled in the second position the internal timing of the emulator may be presented directly to the outside pins so that the address information transitions are one-half cycle ahead of transitions on the data bus.

The ALC signal may be low (e.g., zero) to indicate that the first position is selected and high (e.g., one) to indicate that the second position is selected. The ALC signal may be manually or automatically provided to the emulator, as appropriate.

Figure 7:
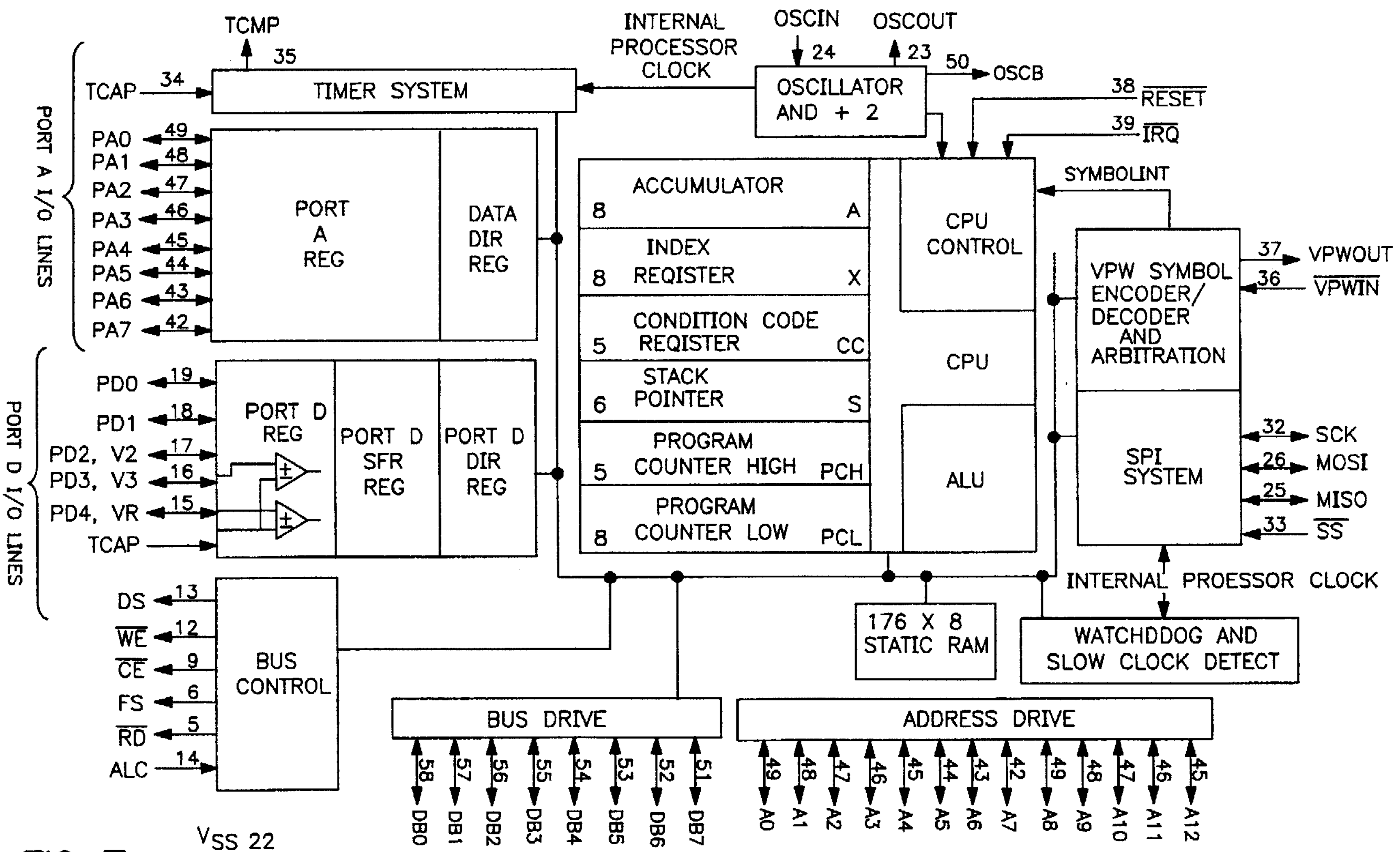
FIG. 7 is block diagram of a further embodiment of the present invention.

A more detailed embodiment of an emulator device in a single chip that incorporates the present invention may be seen in FIG. 7. As shown therein, the ALC signal is provided to a bus control. The address lines are indicated by lines A0–A12, and the data bus port by lines DB0–DB7. The remainder of the components and pins relate to the particular microcontroller being emulated by the emulator of FIG. 7. I/O lines PA and PD are software programmable, and emulator I/O signals VPWOUT and VPWIN(not) interface with a transceiver. The ALC signal may also change the behavior of other components. For example, when ALC is high (address transitions are one-half clock cycle ahead of the data transitions) the internal "STATIC RAM" is disabled and accesses to RAM space are mapped off-chip, and a fetch status (FS) true signal (indicating an opcode fetch is in progress) is provided ahead of data bus transitions, instead of coincident therewith. Further, RD(not) is a status output signal which indicates direction of data flow with respect to external or internal memory space (a low level indicates a read from memory space). A read from internal memory or I/O will place data on the external data bus. When ALC=0, RD(not) is internally gated to CE(not)—a chip enable signal used for selecting external memory of I/O—and generated in synchronization with data bus cycles. With ALC=0 standard RAM, ROM and EPROM devices can be directly connected. When ALC=1, RD(not) is not gated by CE(not) and is produced ahead of data bus transitions.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. An emulator circuit for emulating operation of a computer system in which the emulator circuit may be selectively operated with memory devices that require coincident availability of data and address information during a clock cycle, and with other systems that require address information and data at different times during the clock cycle, the emulator circuit comprising:

a data bus port for receiving data that has a transition during each clock cycle;

plural address information lines, each for communicating address information that has a transition during each clock cycle;

an address latch control switch for each of said address information lines, each having a first position wherein the data transition and address information transition occur at the same time during each clock cycle, and a second position wherein the data transition and the address information transition do not occur at the same time during each clock cycle; and means for selecting said first position or said second position, whereby said first position allows the emulator circuit to interface with memory devices that require coincident availability of data and address information, and said second position allows the emulator circuit to interface with other systems that require address information and data at different times.

2. The emulator circuit of claim 1 wherein the address information transition leads the data transition by approximately one-half a clock cycle when said address latch control switch is in said second position.

3. The emulator circuit of claim 1 wherein said first position is for providing a digital low voltage level.

4. The emulator circuit of claim 1 wherein said means for selecting comprises a NOR gate for receiving an address latch control signal that is either high or low and an address latch enable signal that is either high or low.

5. The emulator circuit of claim 4 wherein the address information transition leads the data transition by approximately one-half a clock cycle when the address latch control signal is high.

6. The emulator circuit of claim 4 wherein the address information transition is coincident with the data transition when the address latch control signal is low.

7. The emulator circuit of claim 1 wherein each said address latch control switch comprises an address buffer having a latch for delaying the address information transition.

8. The emulator circuit of claim 7 wherein said latch delays the address information transition by approximately one-half a clock cycle when said address latch control switch is in said first position.

9. The emulator circuit of claim 7 wherein said means for selecting comprises a logical gate for receiving an address latch control signal.

10. The emulator circuit of claim 9 wherein the address information transition is coincident with the data transition when the address latch control signal has a first state.

11. The emulator circuit of claim 9 wherein the address information transition leads the data transition by approximately one-half a clock cycle when the address latch control signal has a second state.

12. An emulator circuit for emulating operation of a computer system, the emulator circuit comprising:

a data bus port for receiving data that has a transition during a clock cycle;

plural address information lines, each for communicating address information that has a transition during the clock cycle;

an address buffer for each of said address information lines, each said address buffer having a latch with first position wherein the data transition and address information transition occur at the same time during a clock cycle, and a second position wherein the address information transition leads the data transition by about one-half clock cycle; and a logical gate for receiving an address latch control signal that is either high or low and an address latch enable signal that is either high or low, said logical gate for selecting said first position when the address latch control signal is low and for selecting said second position when the address latch control signal is high, whereby said first position allows the emulator circuit to interface with devices that require coincident availability of data and address information, and said second position allows the emulator circuit to interface with devices that require address information and data at different times.

13. The emulator circuit of claim 12 wherein said logical gate is a NOR gate.

14. The emulator circuit of claim 12 further comprising an internal RAM that is disabled when said latch is in said second position.

15. The emulator circuit of claim 12 wherein the computer system is a microcontroller.

16. An emulator circuit for emulating operation of a microcontroller, the emulator circuit comprising:

a data bus port for receiving data that has a transition during a clock cycle;

plural address information lines, each for communicating address information that has a transition during the clock cycle; and means for selectively changing a time difference between arrival of address information transitions and arrival of data transitions during a clock cycle to either zero or one-half clock cycle.

17. A method of emulating operation of a computer system with an emulator circuit that may be selectively operated with devices that require coincident availability of data and address information during a clock cycle, and with devices that require address information and data at different times during the clock cycle, the method comprising the steps of:

(a) receiving at a data bus port data that has a transition during each clock cycle;

(b) communicating in plural address information lines address information that has a transition during each clock cycle;

(c) selecting a first position in an address latch control switch for each of the address information lines, the first position providing the data transition and the address information transition at the same time during each clock cycle; and (d) selecting a second position in the address latch control switch, the second position providing the data transition and the address information transition at different times during each clock cycle, whereby the first position allows the emulator circuit to interface with devices that require coincident availability of data and address information, and the second position allows the emulator circuit to interface with devices that require address information and data at different times.

18. The method of claim 17 wherein the address information transition leads the data transition by approximately one-half a clock cycle when the address latch control switch is in the second position.

19. The method of claim 18 further comprising the step of providing an address latch control signal that is either high or low, the address latch control signal being low for indicating that the first position is selected and being high for indicating that the second position is selected.

20. The method of claim 19 further comprising the step of providing the address latch control signal to a logical gate that indicates to the address latch control switch whether the address latch control signal is high or low.

21. The method of claim 17 wherein the address latch control switch has a latched address buffer which delays the address information transition by approximately one-half a clock cycle when the address latch control switch is in the first position.

* * * * *